US009050564B2

(12) United States Patent
Meyer-Blumenroth et al.

(10) Patent No.: US 9,050,564 B2
(45) Date of Patent: Jun. 9, 2015

(54) FILTER MODULE AND SYSTEM HAVING SPIRALLY WOUND MEMBRANE FILTERS, AND METHOD FOR THE PRODUCTION THEREOF

(75) Inventors: Ulrich Meyer-Blumenroth, Idstein-Woersdorf (DE); Reinhard Voigt, Gotha (DE)

(73) Assignee: MN Beteiligungs GmbH, Wiesbaden (DE)

( * ) Notice: Subject to any disclaimer, the term of this patent is extended or adjusted under 35 U.S.C. 154(b) by 353 days.

(21) Appl. No.: 13/055,957

(22) PCT Filed: Jul. 29, 2009

(86) PCT No.: PCT/EP2009/005471
§ 371 (c)(1),
(2), (4) Date: Jan. 26, 2011

(87) PCT Pub. No.: WO2010/015345
PCT Pub. Date: Feb. 11, 2010

(65) Prior Publication Data
US 2011/0120931 A1    May 26, 2011

(30) Foreign Application Priority Data

Aug. 4, 2008    (DE) .................... 10 2008 036 098

(51) Int. Cl.
*B01D 63/10*    (2006.01)
*B01D 63/12*    (2006.01)

(52) U.S. Cl.
CPC ............. *B01D 63/10* (2013.01); *Y10T 29/4998*
(2015.01); *B01D 63/103* (2013.01); *B01D 63/12* (2013.01); *B01D 2319/02* (2013.01)

(58) Field of Classification Search
CPC .... B01D 63/10; B01D 69/10; B01D 2319/02; B01D 46/0013; B01D 63/12; B01D 63/103; Y10T 29/4998
See application file for complete search history.

(56) References Cited

U.S. PATENT DOCUMENTS

| | | | | |
|---|---|---|---|---|
| 4,235,723 A | * | 11/1980 | Bartlett, Jr. | 210/321.83 |
| 4,855,058 A | * | 8/1989 | Holland et al. | 210/652 |
| 5,304,312 A | | 4/1994 | Forster et al. | |
| 6,168,648 B1 | | 1/2001 | Ootani et al. | |
| 6,423,123 B1 | * | 7/2002 | Rosenberg et al. | 96/154 |
| 2003/0205520 A1 | * | 11/2003 | Johnson | 210/321.85 |
| 2005/0035047 A1 | * | 2/2005 | Colby et al. | 210/321.74 |
| 2008/0190849 A1 | * | 8/2008 | Vuong | 210/652 |

FOREIGN PATENT DOCUMENTS

| | | |
|---|---|---|
| DE | 2 213 165 | 6/2002 |
| EP | 0 251 620 A1 | 1/1988 |
| EP | 0 443 642 A2 | 8/1991 |
| EP | 0 925 825 A2 | 6/1999 |
| EP | 1 256 372 A2 | 11/2002 |
| JP | 08 196876 | 8/1996 |
| JP | 2004275822 A * | 10/2004 |

\* cited by examiner

*Primary Examiner* — John Kim
(74) *Attorney, Agent, or Firm* — ProPat, L.L.C.

(57) ABSTRACT

The invention relates to a filter module having one or more spirally wound flat filter elements comprising permeate outlet openings on one or two edges, a method for the production of the filter module, and a filtration system formed from one or more filter modules.

33 Claims, 15 Drawing Sheets

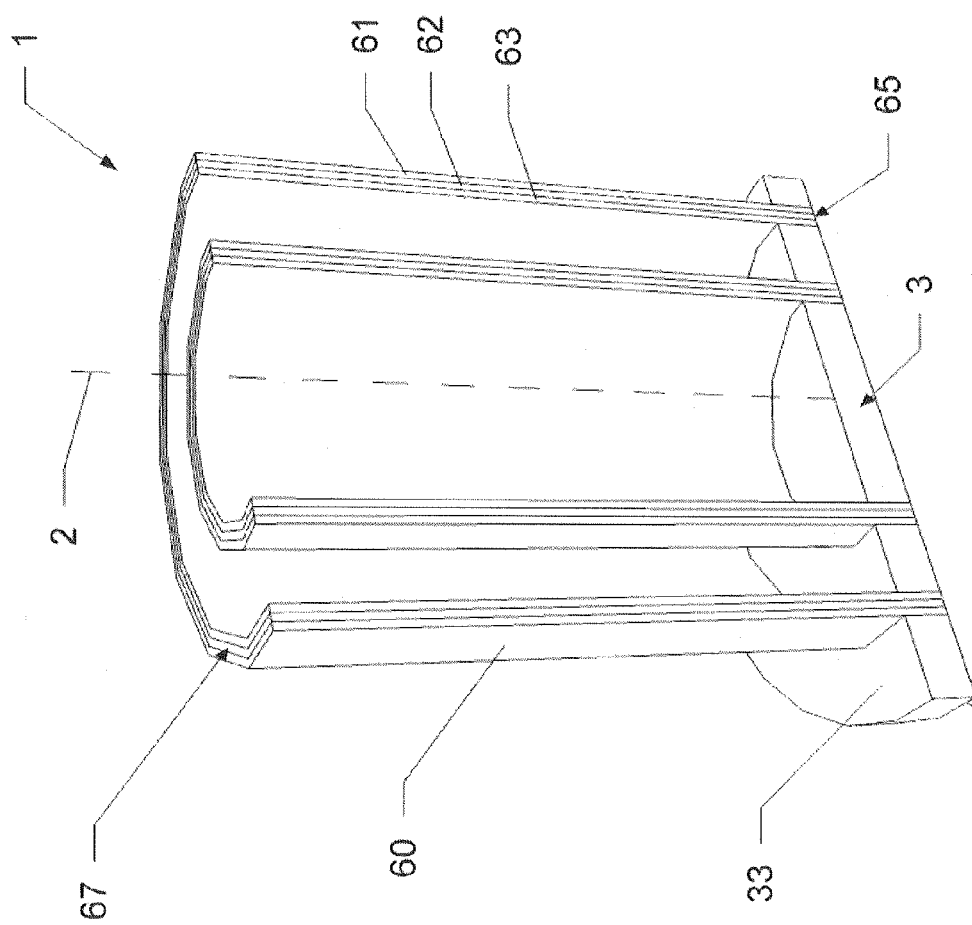

FILTER MODULE AND SYSTEM HAVING SPIRALLY WOUND MEMBRANE FILTERS, AND METHOD FOR THE PRODUCTION THEREOF

CROSS-REFERENCE TO RELATED APPLICATIONS

This application is being filed under Rule 1.371 as a National Stage Application of pending International Application No. PCT/EP2009/005471 filed Jul. 29, 2009, which claims priority to the following parent application: German Patent Application No. 10 2008 036 098.8, filed Aug. 4, 2008. Both International Application No. PCT/EP2009/005471 and German Patent Application No. 10 2008 036 098.8 are hereby incorporated by reference herein in their entirety.

FIELD OF THE INVENTION

The present invention relates to a filter module having spirally wound flat filter elements, to a method for the production thereof and to a filtration system constructed from the filter modules.

BACKGROUND OF THE INVENTION

Filters having a spiral winding are known in the prior art. DE 2 213 165 discloses a filter of this type, in which the filter cartridge consists of a multi-layer cloth which is wound up spirally and has two opposite, spiral end surfaces. The layers forming the cloth are sealed in such a manner that the fluid entering the filter cartridge through a spiral end surface has to flow through at least one filter surface before being able to leave the filter cartridge again. Each filter layer is located between two thin spacer layers having a high pore volume. At least one fluid-impermeable layer is placed against the surface of one of the spacer layers. By means of the use of a thin spacer layer, a compact filter cartridge having a large active filter surface per unit of volume is obtained.

U.S. Pat. No. 5,304,312 describes a sealed filter unit with a first and second end cap on the end side, wherein the end caps have connectors for the connection of lines for an untreated liquid to be filtered and for a permeate filtered out of said untreated liquid. The filter unit contains a filter element which is arranged between the end caps and consists of a spirally wound, two-layer filter composite material which comprises a filter layer and a liquid-impermeable spacer layer. At the two opposite end sides of the spirally wound filter composite material, the edges of the filter layer are each connected in a liquid-tight manner to the spacer layer adjacent on the left and right. This construction ensures that the untreated liquid supplied via the first end cap has to permeate the filter layer first in order to be removed as permeate at the second end cap.

EP 1 256 372 A2 (whose United States equivalent is United States Patent Publication No. 2002/168491A1) teaches a filter module which comprises a capillary filter mat wound spirally around a perforated pipe. An untreated fluid to be filtered is supplied through the perforated pipe and brought into contact with the spirally wound capillary filter mat. By means of a pressure differential between the inside and outside of the capillary filters, a permeate is filtered out of the untreated fluid and removed from the interior of the capillary filters. Access to the interior of the capillary filters is provided by the two end sides of the spirally wound capillary filter mat being provided with end caps made of a castable, curable material and the end caps obtained being cut to size substantially perpendicularly to the longitudinal axis of the capillary filters.

The filters which are known in the prior art and have spirally wound, multi-layer flat filter elements or capillary filter mats have one or more of the disadvantages mentioned below:
  in order to separate untreated liquid and permeate, a liquid-impermeable layer is required, which increases the volume of the filter without contributing to the active filtration surface;
  the individual layers of the flat filter elements are connected to one another only at the edges, and therefore have low mechanical stability;
  due to the low mechanical stability, during the production and in particular during the winding to form a spiral, the flat filter elements are susceptible to creasing and warpage, and therefore the corresponding production methods are limited to small filter layer lengths.

SUMMARY OF ADVANTAGEOUS EMBODIMENTS OF THE INVENTION

It is the object of the invention to overcome the above-mentioned disadvantages and to provide a filter module having a spiral winding, the filter module having high pressure resistance and large individual filter layer surfaces and being back-flushable and suitable for use in commercial filtration systems.

This object is achieved by a filter module which comprises one or more flat filter elements wound spirally about an axis, a first end wall and optionally a second end wall, wherein each flat filter element comprises two filter membranes and a drainage layer arranged between the filter membranes; each flat filter element has first and second edge regions which run substantially in the direction of the axis and are sealed in a fluid-tight manner; each flat filter element has a third edge region which is connected to the first end wall; the third edge region is open on an outer side of the first end wall; the third edge region is sealed in a fluid-tight manner in relation to an inner side of the first end wall; and each flat filter element has a fourth edge region which is sealed in a fluid-tight manner in relation to the inner side of the first end wall.

Further preferred embodiments of the filter module according to the invention are reproduced in the claims.

BRIEF DESCRIPTION OF THE FIGURES

The invention is explained in more detail below with reference to figures, in which, in a schematic illustration;
FIGS. 1a-b show a filter module with a flat filter element and an end wall in a perspective full and section view;
FIGS. 3a-c show cross sections through filter modules having spirally wound flat filter elements with spacers in between.

DETAILED DESCRIPTION OF ADVANTAGEOUS EMBODIMENTS OF THE INVENTION

Figure 1A:
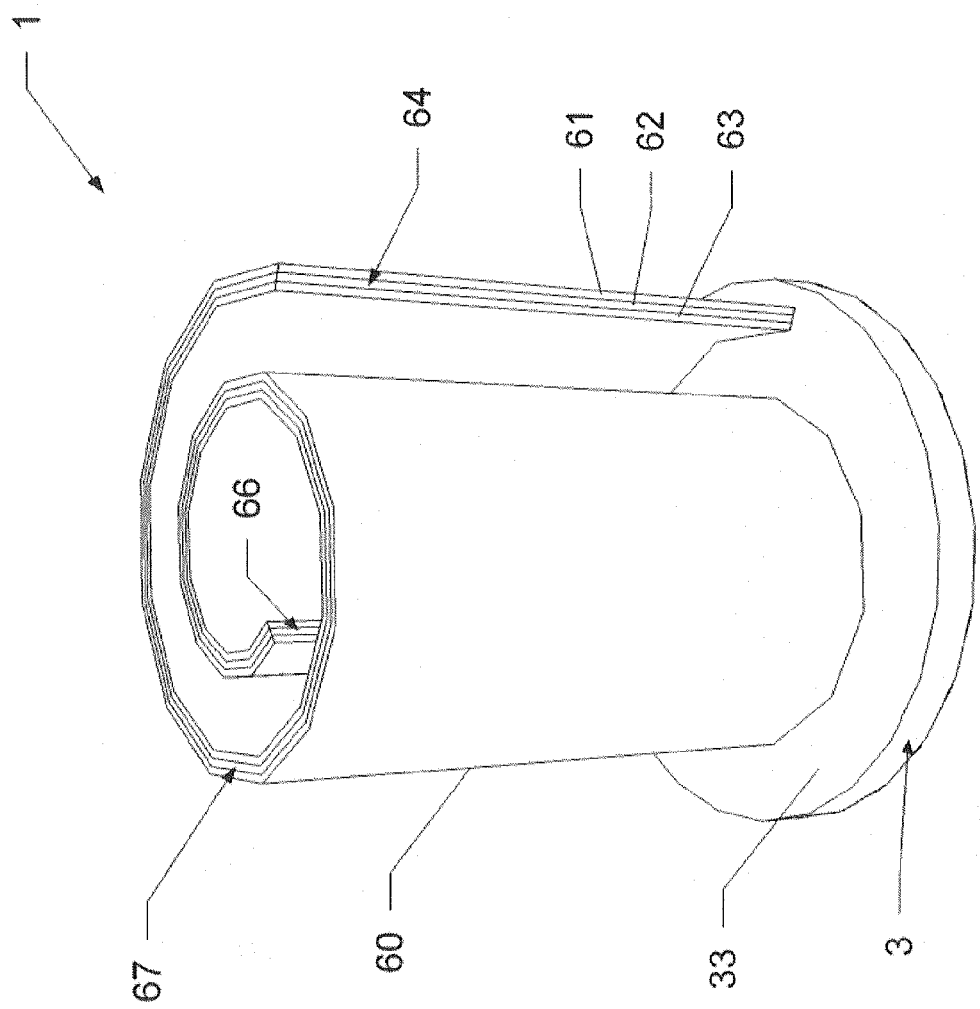

FIGS. 1a and b show a filter module 1 according to the invention having a spirally wound flat filter element 60 and an end wall 3. The flat filter element 60 comprises two filter membranes (61, 63) and a drainage layer 62 located in between. The filter membranes (61, 63) are preferably each laminated with one of the two sides of the drainage layer 62. In particular, the flat filter elements 60 are manufactured from a ribbon-shaped, preferably flexible filter composite material which is laminated in a virtually continuously operated laminator from two ribbon-shaped filter membranes and a ribbon-shaped drainage layer by means of liquid adhesive or solid ribbon-shaped adhesive means, such as adhesive nets or adhesive films. In order to produce the ribbon-shaped filter composite material, for example, a first ribbon-shaped filter membrane, a first ribbon-shaped adhesive net of thermoplastic polymer, a ribbon-shaped drainage layer, a second ribbon-shaped adhesive net of thermoplastic polymer and a second ribbon-shaped filter membrane are each supplied from a separate stock reservoir reel and combined in a pressure roll couple to form a ribbon-shaped stack, the ribbon-shaped stack is heated at its top and bottom sides in a heated roll couple and subsequently cooled such that the first and second adhesive nets melt and subsequently cool, causing the drainage layer to become durably adhesion bonded to the filter membranes.

The drainage layer is composed of a polymer, inorganic or metallic ribbon material which has an open structure to conduct fluids through. The material of the drainage layer is preferably a lattice or spacer knit made of plastic. Spacer knits known in the prior art consist of first and second sheet-like loop structures and a system of pile threads arranged between said first and second loop structures. The pile threads are spaced regularly relative to one another and in the warp or weft direction of the loop structures, each pile thread passing alternately through loops of the first and second loop structures such that the pile thread describes a sawtooth or spiral course.

The filter membrane is constructed of one or more layers, preferably two layers. Customary two-layer filter membranes consist of a support nonwoven and of a porous membrane layer. During the production of filter composite material, the support nonwoven is bonded to or laminated with the drainage layer such that the porous membrane layer is arranged on the outer side of the filter composite material. The porous membrane layer is bonded to or laminated with the support nonwoven by wet coagulation or lamination. In wet coagulation, the porous membrane layer is deposited on the support nonwoven; otherwise, it is laminated onto the support nonwoven. The porous membrane layer preferably consists of polyethersulfone, polysulfone, polyacrylonitrile, polyvinylidene fluoride, polyamide, polyetherimide, cellulose acetate, regenerated cellulose, polyolefin or fluoropolymer. The porous membrane layer is for example produced by a nonwoven or woven fabric being coated with polymer solution and the polymer being precipitated out in a subsequent phase inversion step. Alternatively thereto, a polymer sheet is suitably stretched to produce pores in the polymer sheet. The stretched polymer sheet is then laminated onto a support nonwoven for mechanical stabilization. Filter membranes produced by these methods are commercially available, for example as NADIR® membranes (MICRODYN-NADIR GmbH, Wiesbaden) or Celgard® flat sheet membranes (Celgard Inc., Charlotte, N.C., USA).

In order to produce flat filter elements 60, filter blanks having a suitable, preferably rectangular shape, are cut out, for example, from a filter composite material of the above-described type. The filter blanks obtained are sealed in a fluid-tight manner at the edges by means of known methods, such as, for example

- bonding the drainage layer to the filter membranes by thermal or ultrasonic welding;
- adhering, wherein, in an edge region of the filter blank, a liquid adhesive is introduced between the drainage layer and the filter membranes and cured/cross-linked;
- dip cementing, wherein an edge region of the filter blank has an adhesive applied on the top and bottom sides and also on the cut face/abutting edge;
- machine stitching with a thread; or
- by means of a mechanical clamping device.

In this case, at least two mutually opposite edge regions, preferably three or four edge regions of the filter blanks, are sealed in a fluid-tight manner over their entire length.

The preferably rectangular flat filter elements 60 thus obtained have a first and second edge region (64, 66) sealed in a fluid-tight manner and a third and fourth open (i.e. unsealed) or sealed edge region (65, 67).

One or more flat filter elements 60 stacked on one another are wound to form a cylindrical spiral body and are fixed in said shape by suitable mechanical holding devices, such as, for example, bands or rings. The flat filter elements 60 are preferably wound around a distributor pipe 70 (see FIG. 2b). In a development of the invention, one or more spacer elements 80 which are of sheet-like design through which the flow can pass are added to the single- or multi-layer stack of flat filter elements 60 prior to the winding of the spiral body (see FIG. 3). Said spacer elements 80 are, for example, wide-meshed lattices or nets made of plastic. One spacer element 80 is preferably inserted in each case between two flat filter elements 60.

The spiral body which is fixed by means of holding devices with the optional distributor pipe 70 is provided with a first end wall 3 by being cast on the end side with a liquefied, curable material and the material subsequently being cured, with the first end wall 3 enclosing the third edges 65 in a fluid-tight manner. In order to produce the first end wall 3, for example, a casting mold having a rectangular or circular inner cross section and a plane base is filled to a predetermined height with epoxy resin. In order to reinforce the end wall 3, it is expedient to mix glass or carbon fibers in with the epoxy resin. Subsequently thereto, the spiral body is oriented relative to the casting body in such a manner that the first edge region 65 is fully immersed in the epoxy resin. The epoxy resin is then cured thermally or by means of UV light to form a perform which encloses the first edge region 65 in a fluid-tight manner. The preform is removed from the casting mold and is mechanically machined by means of sawing, milling, turning or grinding machines in order to provide the first end wall 3 with a precisely defined final shape and in order to expose and to open the edge region 65 on the outer side 31 of the end wall 3, thus producing access through which the flow can pass to the interior of the flat filter element 60, i.e. to the drainage layer 62.

Figure 2A:
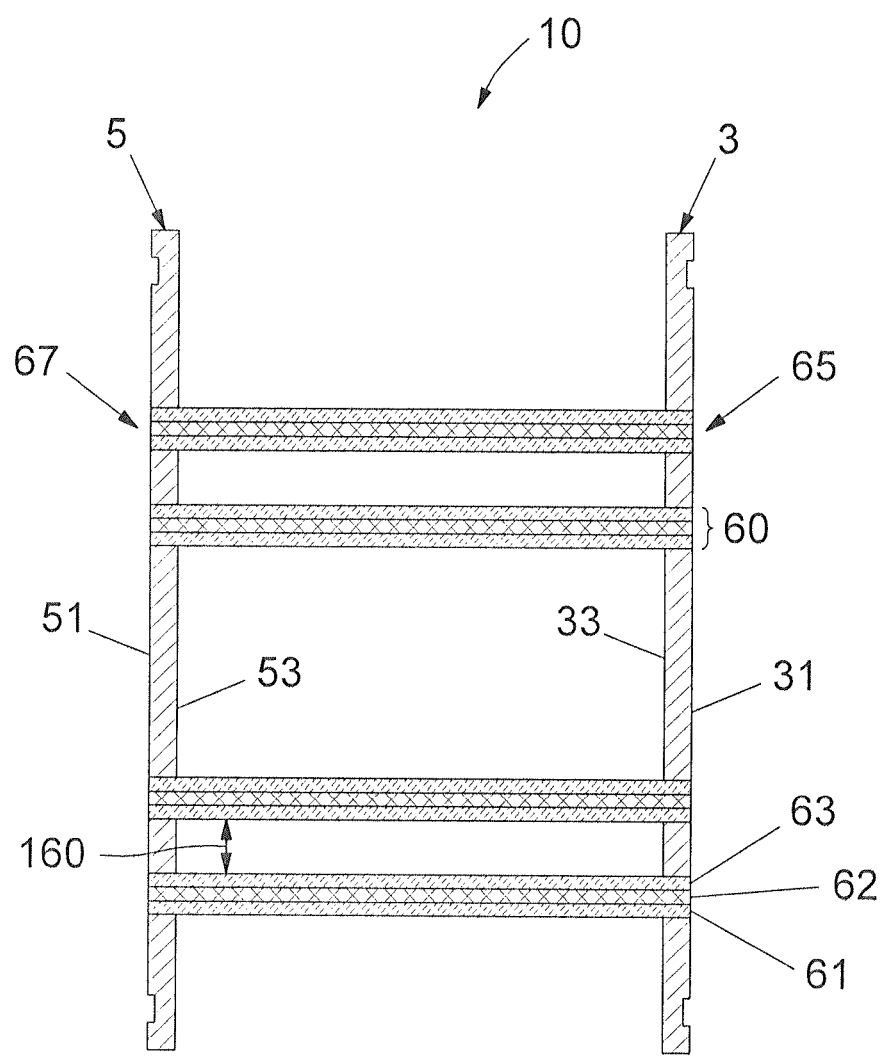
FIGS. 2a-c show sectional views of filter modules with two end walls.

Owing to the three-layered construction thereof consisting of two filter membranes (61, 63) and the drainage layer 62 located in between, the flat filter elements 60 are robust and withstand a trans-membrane differential pressure between the outer side of the filter membranes (61, 63) and the drainage layer 62 of greater than 2 bar, preferably greater than 10 bar, and particularly preferably greater than 20 bar without mechanical damage or leaks forming. According to the invention, the flat filter elements 60 have a length of 0.1 to 6.0 m, preferably of 0.4 to 4.0 m, and particularly preferably of 0.6 to 2.5 m, in the direction of the axis 2. The space region which is filled with the spirally wound flat filter elements 60 has a radial dimension of 0.05 to 1.5 m, preferably of 0.1 to 1.25 m, and particularly preferably of 0.2 to 0.8 m, with respect to the axis 2 as the central axis of the spiral winding. In this case, the radial distance (referred to in FIGS. 2a and 3a by the reference number 160) between the outer side of the spirally wound flat filter elements 60 and the inner side of the same or further flat filter elements 60, which inner side is adjacent to said outer side, is 0.1 to 20 mm, preferably 0.3 to 8 mm, and particularly preferably 0.5 to 3 mm. The spirally wound filter module 1 having the abovementioned dimensions has an active filtration surface of greater than 50 m$^2$, preferably greater than 250 m$^2$, and particularly preferably of greater than 1000 m$^2$, per filter module. In a development of the invention, the filter module 1 which is shown in FIGS. 1a and 1b is provided with a second end wall 5, wherein the second end wall 5 is manufactured in the same manner as the first end wall 3, for example by casting with a liquefied, curable material. FIG. 2a shows a schematic sectional view through a filter module 10 of the this type having first and second end walls (3, 5). The first end wall 3 has an inner side 33 and an outer side 31, the inner side 33 facing the flat filter elements 60. Analogously thereto, the second end wall 5 has an inner side 53 and an outer side 51. The third and fourth edge regions (65, 67) of the flat filter modules 60 are open on the respective outer sides (31, 51) and are separated in a fluid-tight manner from the inner sides (33, 53). The third and fourth edge regions (65, 67) which are arranged in the end sides (3, 5) and are open on the outer sides (31, 51) connect the interior of the flat filter elements 60, i.e. the drainage layer 62, to two half spaces which are adjacent on the outer sides (31, 51) to the filter module 1 from the outside. The distance between the outer side of the spirally wound flat filter elements 60 and the inner side of the same or further flat filter elements 60, the inner side being adjacent to said outer side, is denoted by a double arrow 160.

Figure 2B:
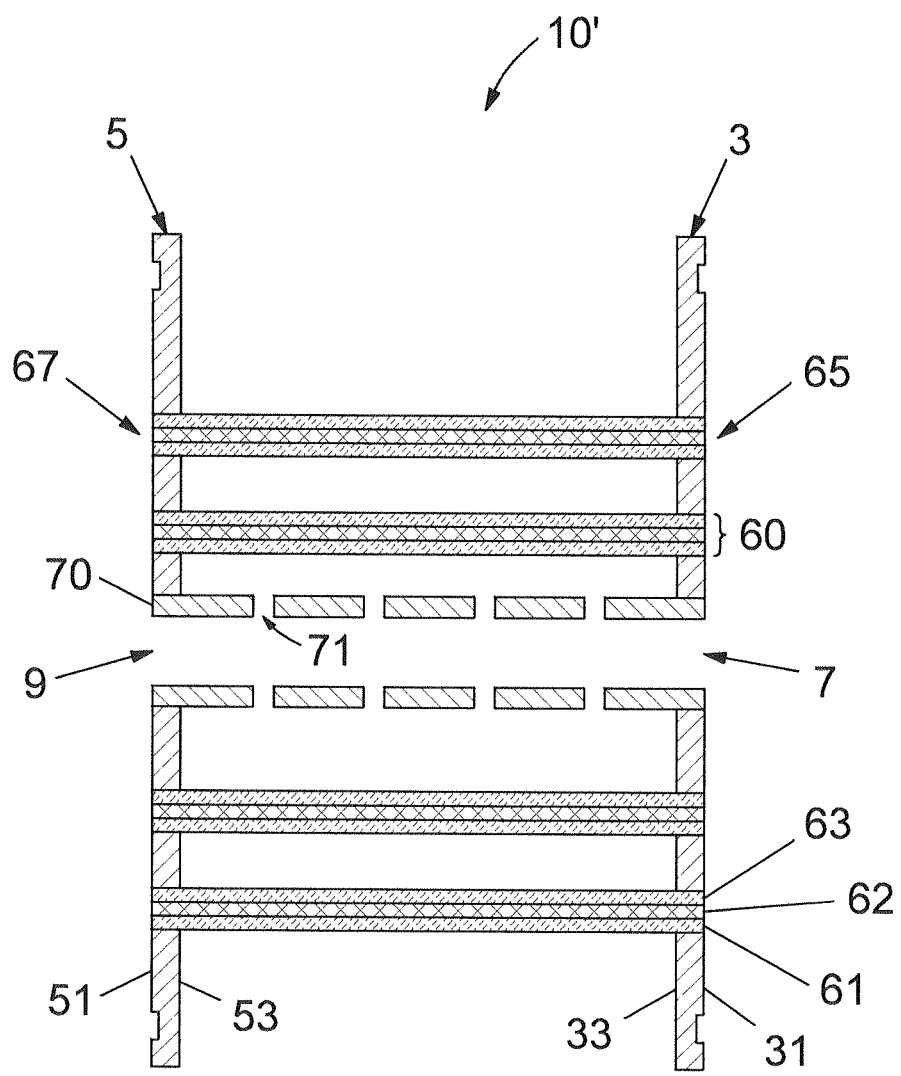

FIG. 2b shows an advantageous embodiment of a filter module 10' according to the invention having two end walls (3, 5) and a centrally arranged distributor pipe 70 which connects two ducts (7, 9) in the end walls (3, 5). The ducts (7, 9) serve to supply and further conduct an untreated fluid which is to be filtered. In the wall thereof, the distributor pipe 70 has one or more openings 71 through which the untreated fluid flows in the radial direction toward the outside into the space between the spirally wound flat filter elements 60.

Figure 2C:
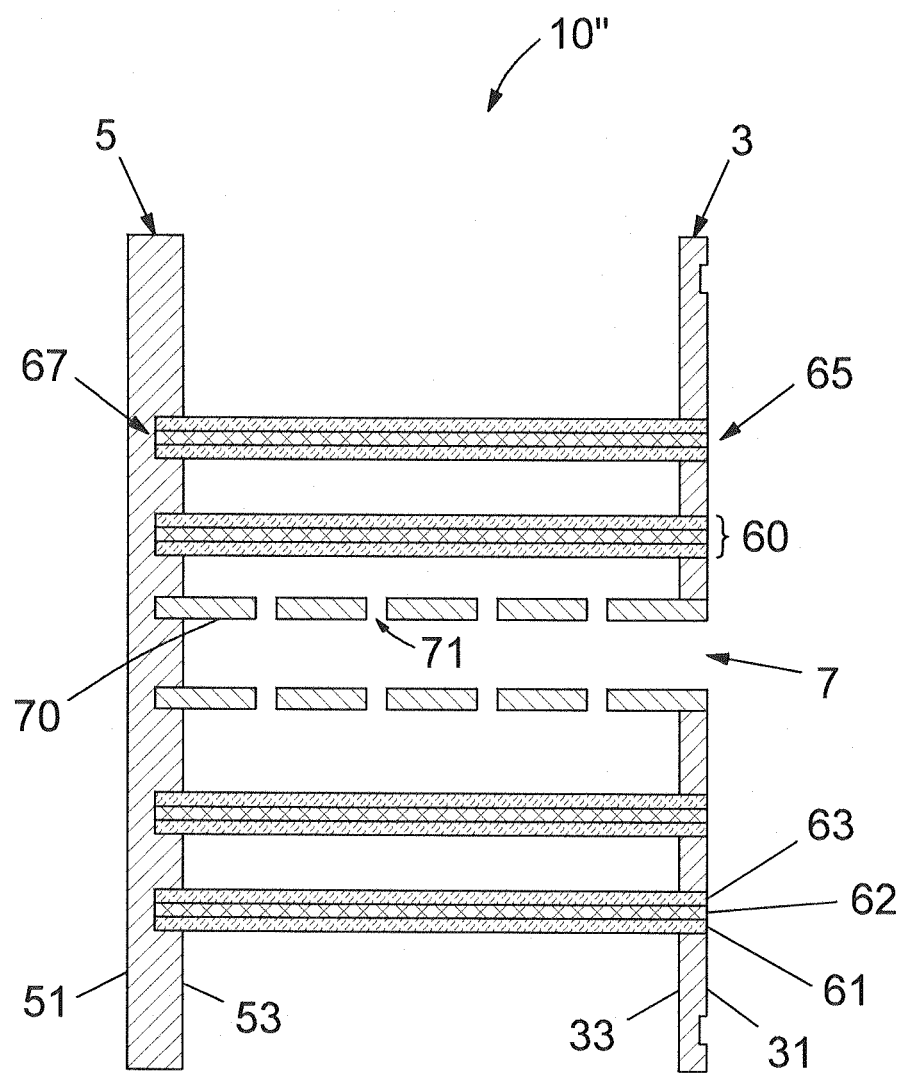

FIG. 2c illustrates a further filter module 10" according to the invention in which the fourth edge region 67 and the optional distributor pipe 70 are enclosed in a fluid-tight manner by the second end wall 5.

Figure 3A:
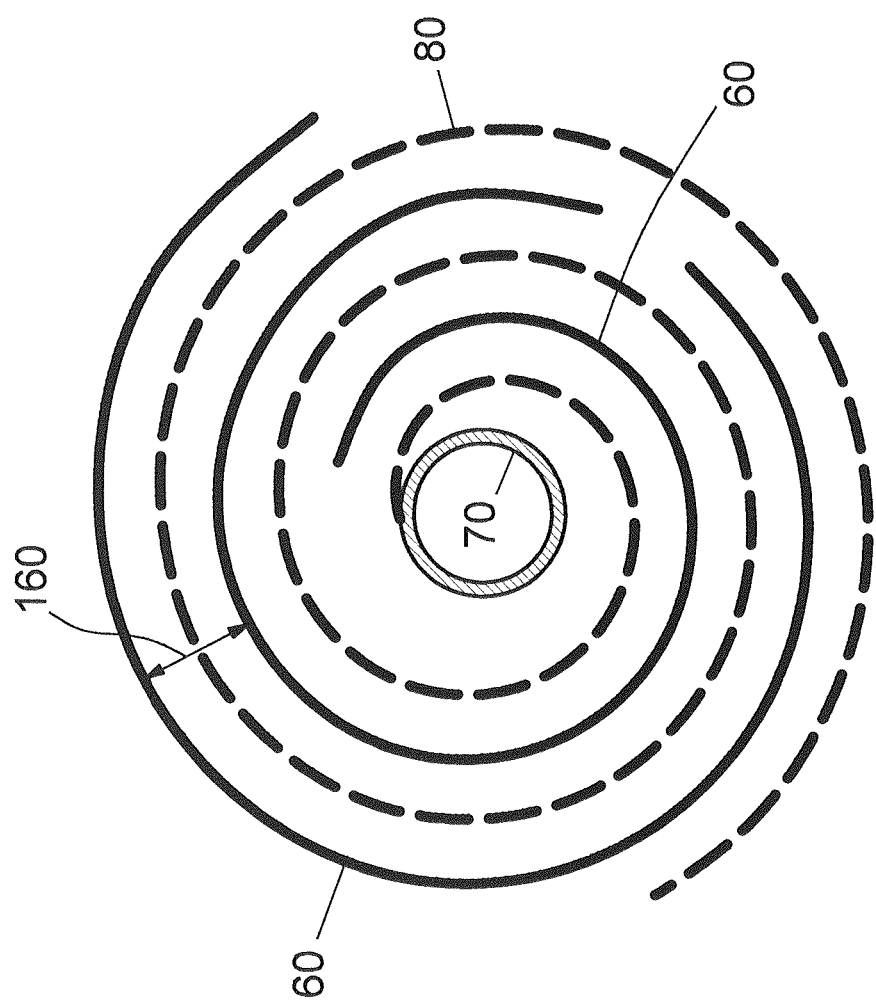

FIG. 3a shows schematically the cross section of a filter module according to the invention with an optional distributor pipe 70 and two spirally wound flat filter elements 60 and a spacer element 80 arranged between the flat filter elements 60. The spacer element 80 is preferably configured as a wide-meshed lattice or net made of plastic. The radial distance between the outer side of the spirally wound flat filter elements 60 and the inner side of the same or further flat filter elements 60, said inner side being adjacent to said outer side, is denoted by a double arrow 160. The radial distance 160 is 0.1 to 20 mm, preferably 0.3 to 8 mm, and particularly preferably 0.5 to 3 mm.

Figure 3B:
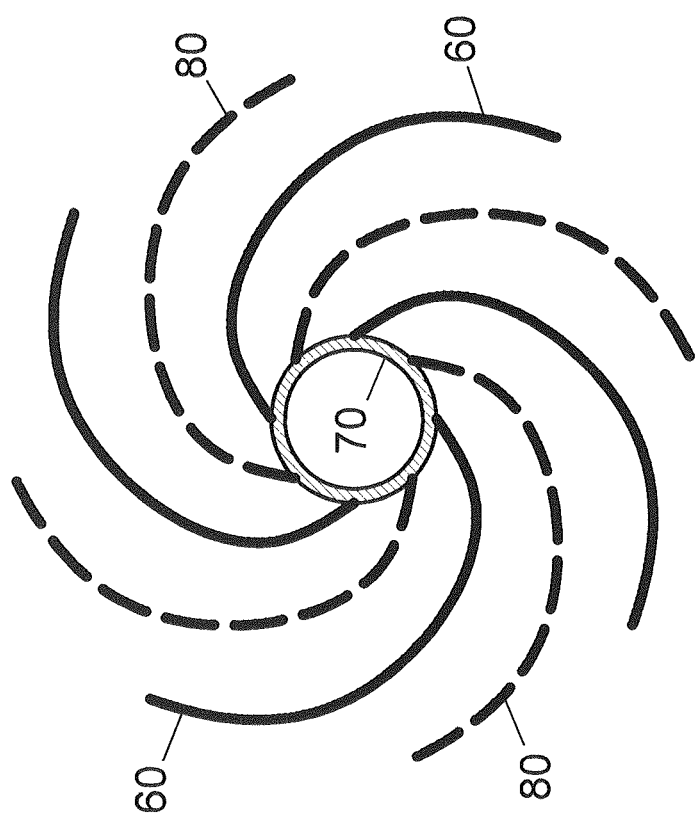
Figure 3C:
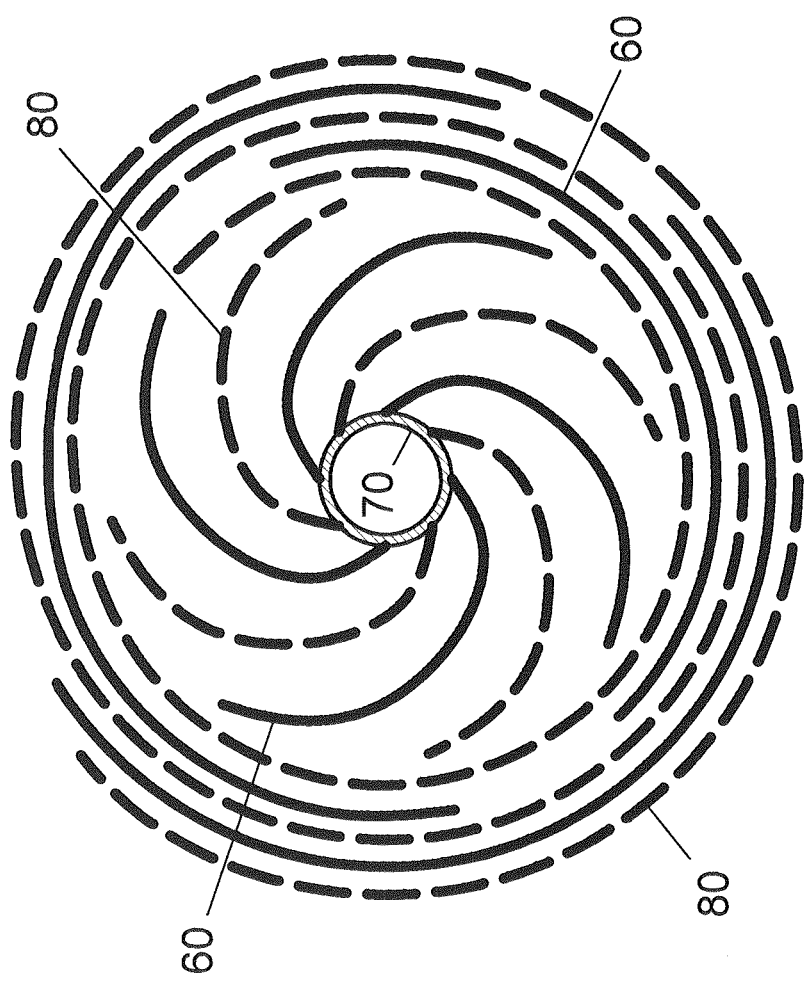

Further examples of spiral wound arrangements according to the invention are shown in FIGS. 3b and 3c in which the reference numbers 60, 70 and 80 have the same meanings as in FIG. 3a. In the wound arrangement according to FIG. 3b, a plurality of flat filter elements 60 extend spirally outward in the manner of rays from starting points which are essentially at the same radial distance from the center axis of the filter module. A respective spacer element 80 is arranged between two adjacent flat filter elements 60. FIG. 3c illustrates a combination of an inner wound arrangement according to FIG. 3b and an outer wound arrangement surrounding the inner wound arrangement, according to FIG. 3a.

Figure 4A:
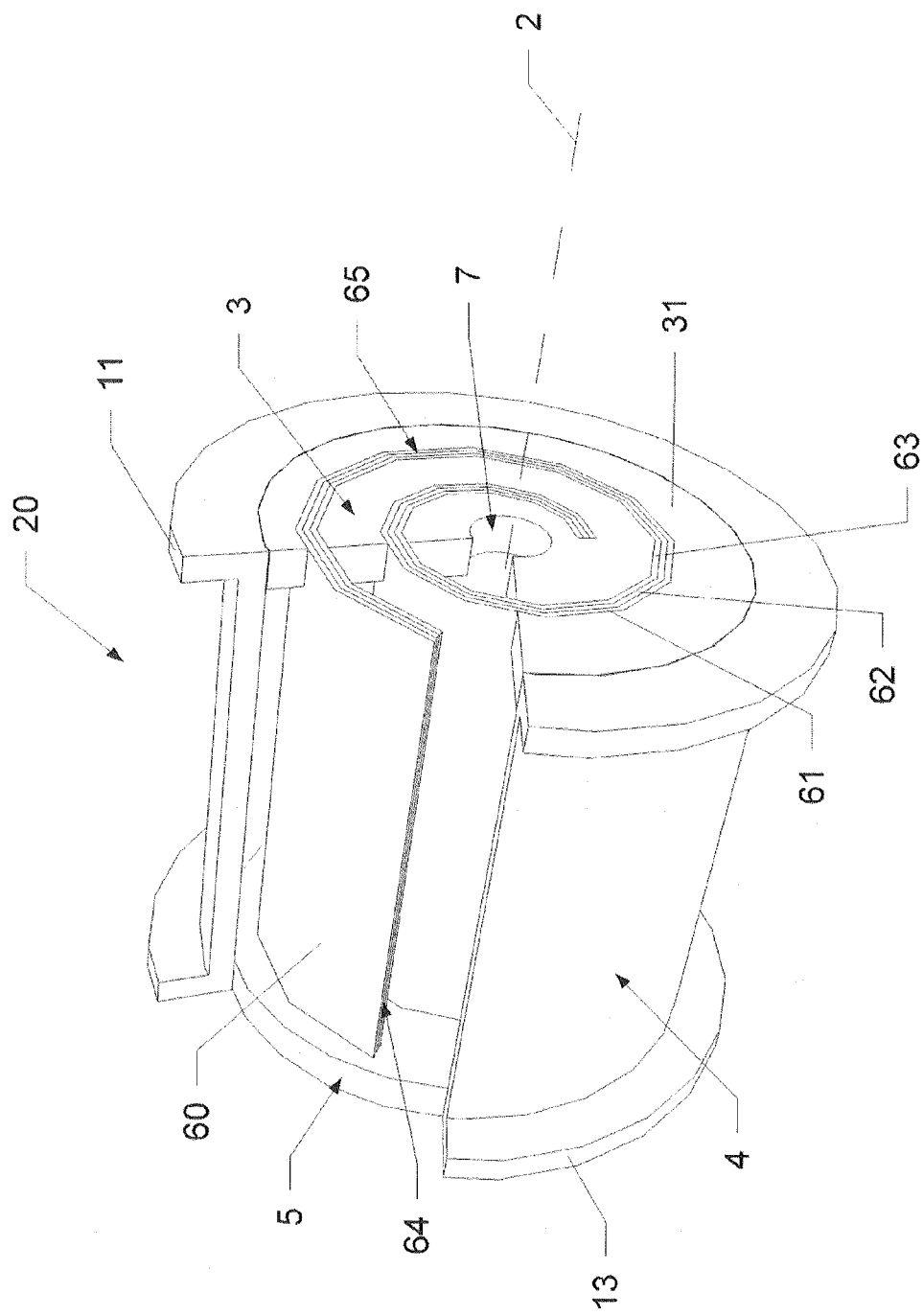
FIGS. 4a-b show perspective sectional views of a filter module with two end walls and a housing.
Figure 4B:
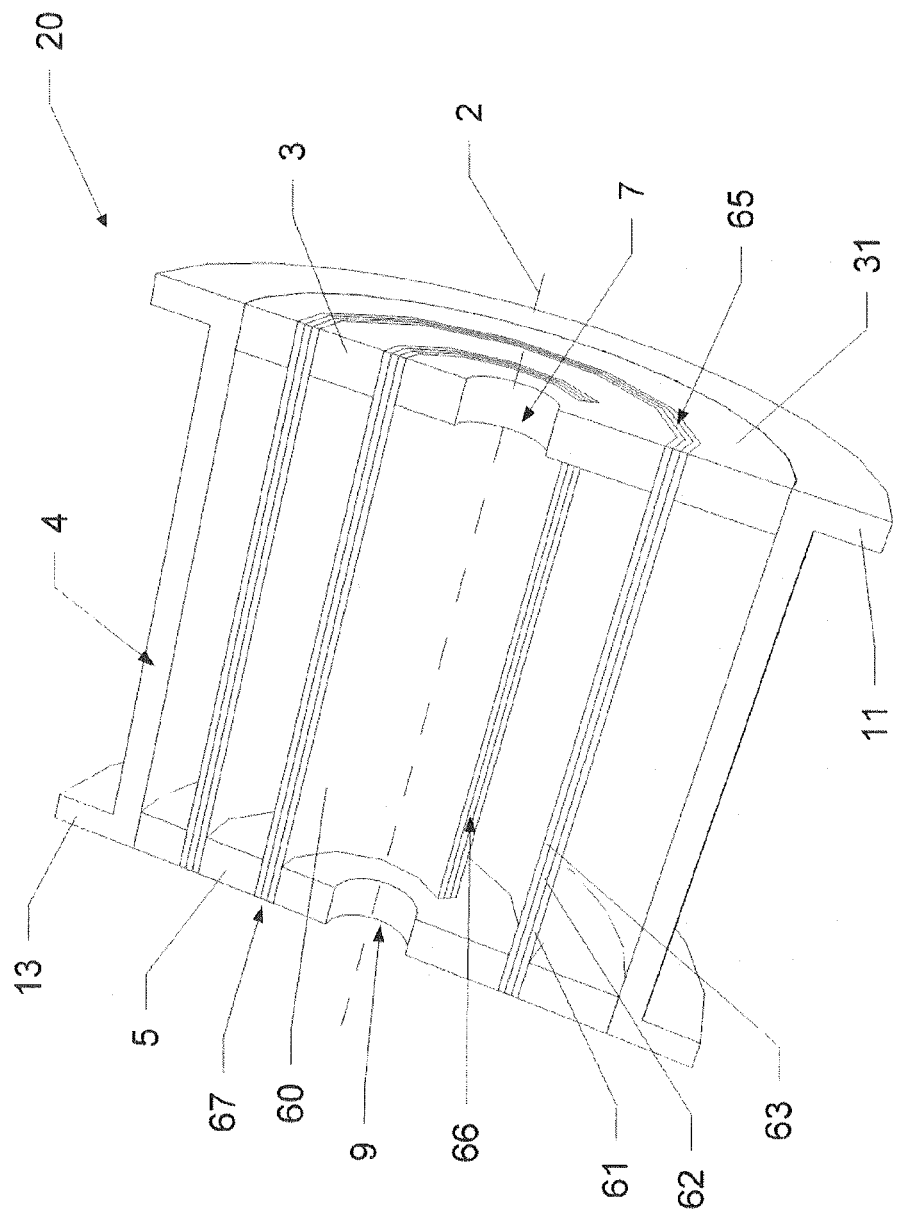

FIGS. 4a and 4b show perspective, partially sectioned views of a further filter module 20 according to the invention with two end walls (3, 5) and a housing 4, wherein the edges of the end walls (3, 5) are connected to the housing 4 in a fluid-tight manner. The end walls (3, 5) are expediently provided with centrally arranged ducts (7, 9) for the conduction through of an untreated fluid to be filtered. The housing 4 is preferably of tubular configuration. In an expedient development, the housing 4 is provided on the end sides with flanges (11, 13) which make it possible to connect the filter module 20 in a simple manner to further filter modules 20 or to other components of a filtration system. Depending on the use and configuration of the filter modules according to the invention, it is expedient to arrange one or both of the ducts (7, 9) (shown in FIGS. 2a and 2b) of the filter module 20 in the housing 4 instead of in the end walls (3, 5). The filter module 20 withstands an internal pressure of greater than 2 bar, preferably greater than 10 bar, and particularly preferably greater than 20 bar, without mechanical damage or leaks forming.

Figure 5A:
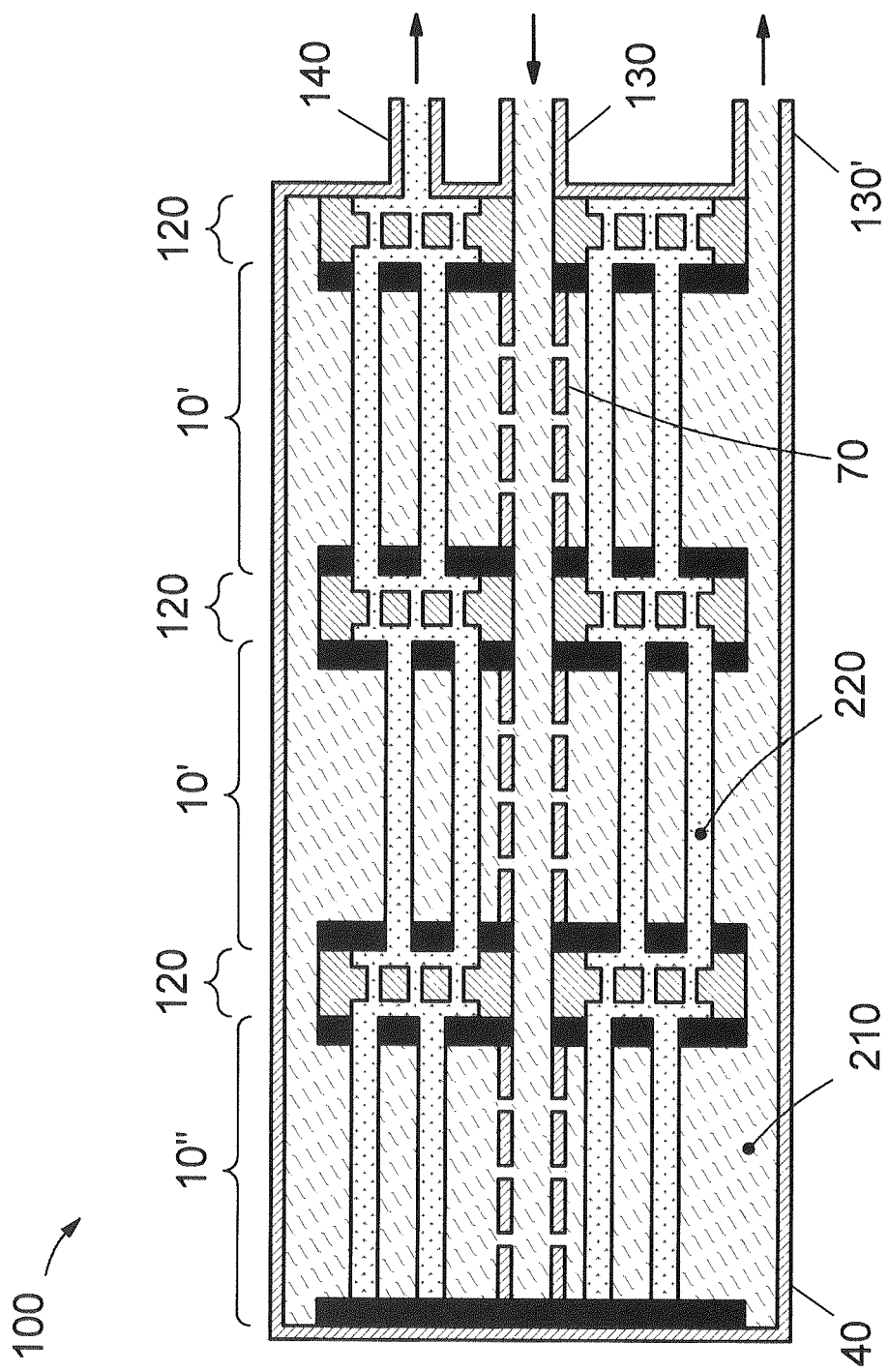
FIGS. 5a-b show sectional views of two filtration systems each having three filter modules arranged in row.

FIG. 5a shows an example of a filtration system 100 according to the invention in which a filter module 10" having two filter modules 10' in a row is arranged in a tank 40. The tank 40 is provided with lines (130, 130', 140) for feeding in and conducting away an untreated fluid 210 to be filtered and for removing a permeate 220 filtered out of the untreated fluid 210. The feeding in and conducting away of the untreated fluid 210 and the removal of the permeate fluid 220 are indicated in FIG. 5a by means of flow arrows, wherein the untreated fluid 210 and the permeate fluid 220 are respectively symbolized by a wavy and dotted hatching pattern. Two of the filter modules (10", 10') and (10', 10') in each case are connected to each other via a coupling 120.

Figure 5B:
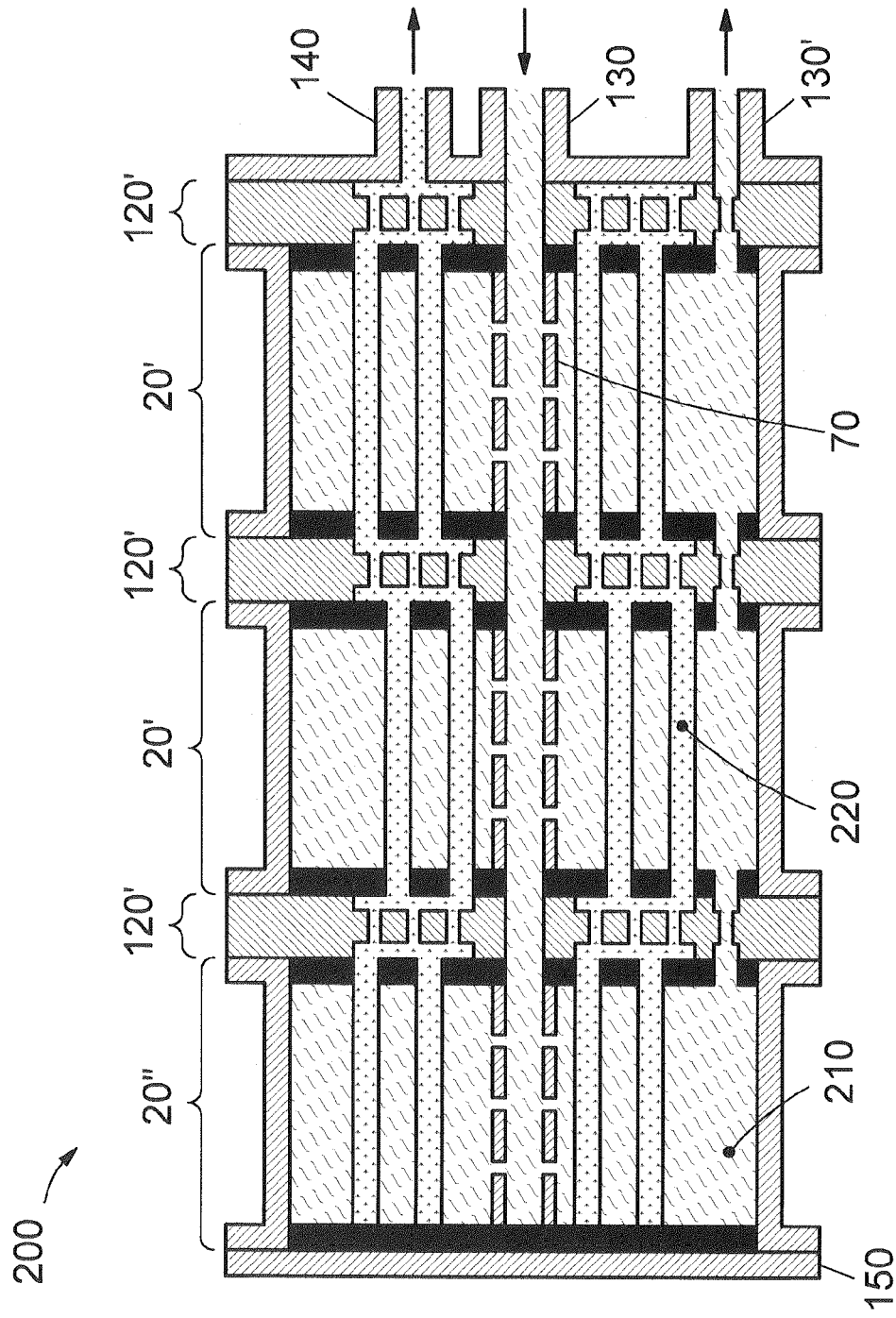

FIG. 5b illustrates a further filtration system 200 according to the invention. The filtration system 200 is composed of three filter modules (20", 20', 20'), wherein two adjacent filter modules (20", 20') and (20', 20') in each case are connected to each other via a coupling 120'. The filter modules (20", 20') involve developments according to the invention of the filter modules 20. In addition to a housing 4, the filter modules (20", 20') are provided with a distributor pipe 70, and at least one end wall (3, 5) which, in addition to a central duct (reference numbers 7 and 9 in FIG. 2b), has one or more peripherally arranged ducts for untreated fluid 210 (reference sign 9' in FIG. 6b). At a first end of the filtration system 200, a filter module 20' is provided via a coupling 120' with lines (130, 130', 140) for feeding in and conducting away an untreated fluid 210 and for removing a permeate 220 filtered out of the untreated fluid 210. An end wall on the end side of the filter module 20" is preferably stabilized mechanically by means of a cover 150.

Figure 6A:
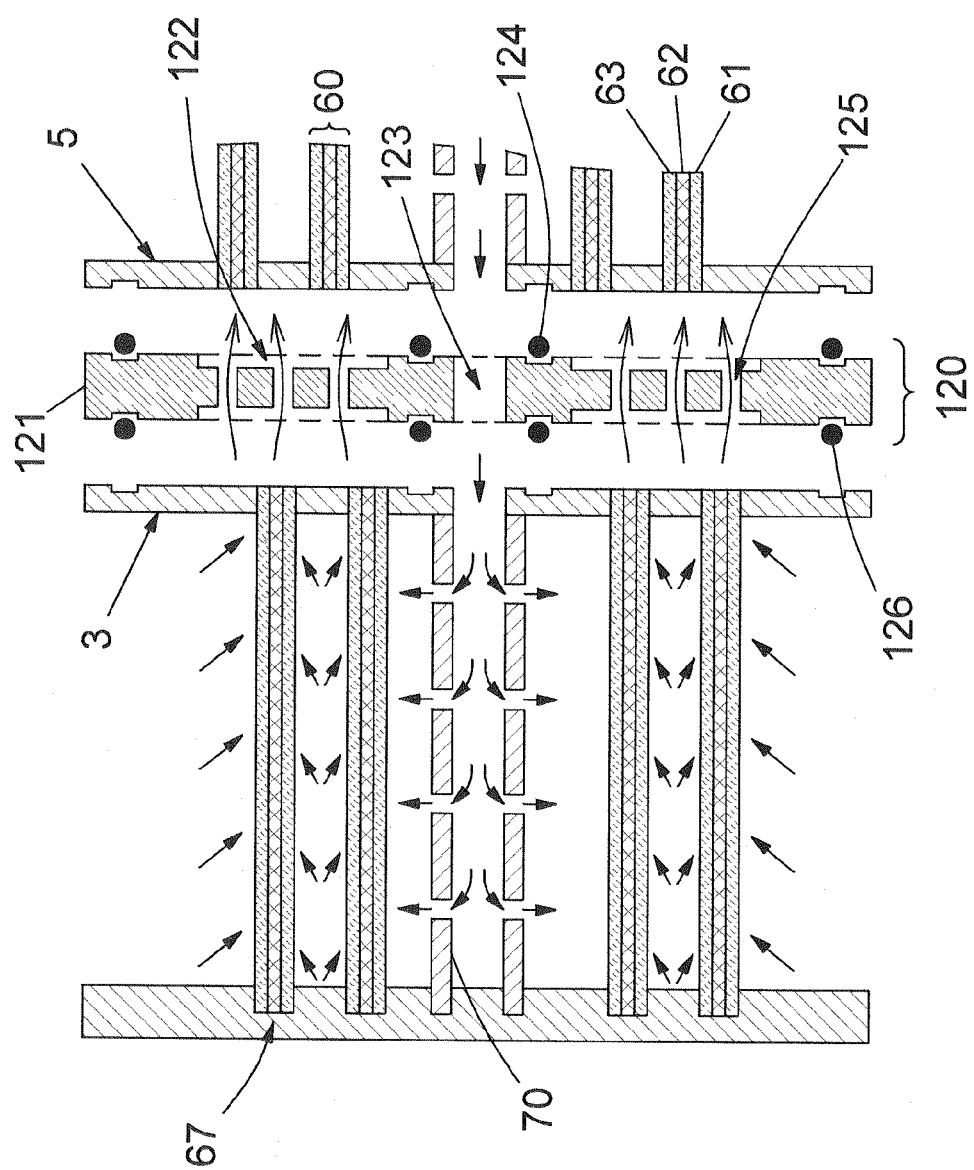
FIGS. 6a-b show detailed sectional views of two adjacent filter modules which are connected by means of a coupling.

FIG. 6a shows, in an exploded illustration, a sectional view of the connection between the filter module 10" and 10' of the filtration system 100 illustrated in FIG. 5a. The coupling 120 comprises a coupling body 121 which is provided with peripherally arranged ducts 125 for permeate fluid—symbolized by open arrows in FIG. 6a. The coupling body 121 optionally has recesses 122 which ensure that the open edge region of the flat filter elements 60 is not partially blocked by the coupling body 121 and the flow can pass fully therethrough. The entirety of the ducts 125 is enclosed in a fluid-tight manner by a respective seal 126 on both sides of the coupling body 121. In an alternative embodiment, each of the ducts 125 is enclosed in a fluid-tight manner by a respective seal 128 on both sides of the coupling body. The seals 126 are preferably designed as conventional O-rings made of an elastic material. A duct 123 arranged centrally in the coupling body 121 serves to feed in and further conduct untreated fluid which is symbolized by closed arrows in FIG. 6a. The duct 123 is separated from the ducts 125 in a fluid-tight manner by means of seals 124.

Figure 6B:
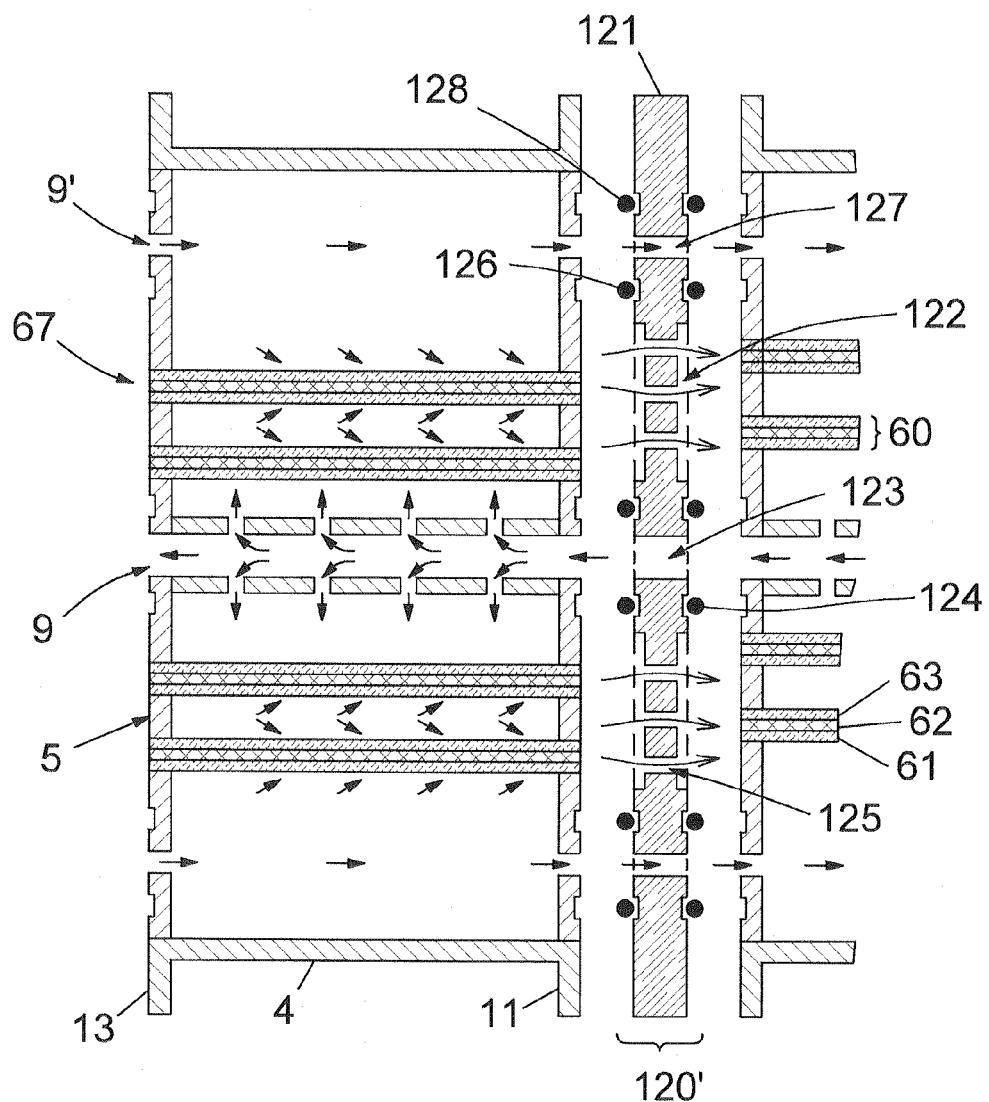

FIG. 6b shows in an exploded illustration, a sectional view of the connection between two adjacent filter modules (20', 20') of the filtration system 200 illustrated in FIG. 5b.

In addition to the ducts 123 and 125, the coupling body 121 has further ducts 127 for untreated fluid (symbolized by closed arrows). The entirety of the ducts 127 is isolated in a fluid-tight manner in relation to the ducts 125 and the outer side of the filter module 20' by means of seals 126 and 128. In an alternative embodiment, each of the ducts 127 is enclosed in a fluid-tight manner by a respective seal 128 on both sides of the coupling body. In addition to a central duct 9 (see also reference numbers 7 and 9 in FIG. 2b), the end walls of the filter modules 20' have one or more peripherally arranged ducts 9' for untreated fluid.

Figure 7:
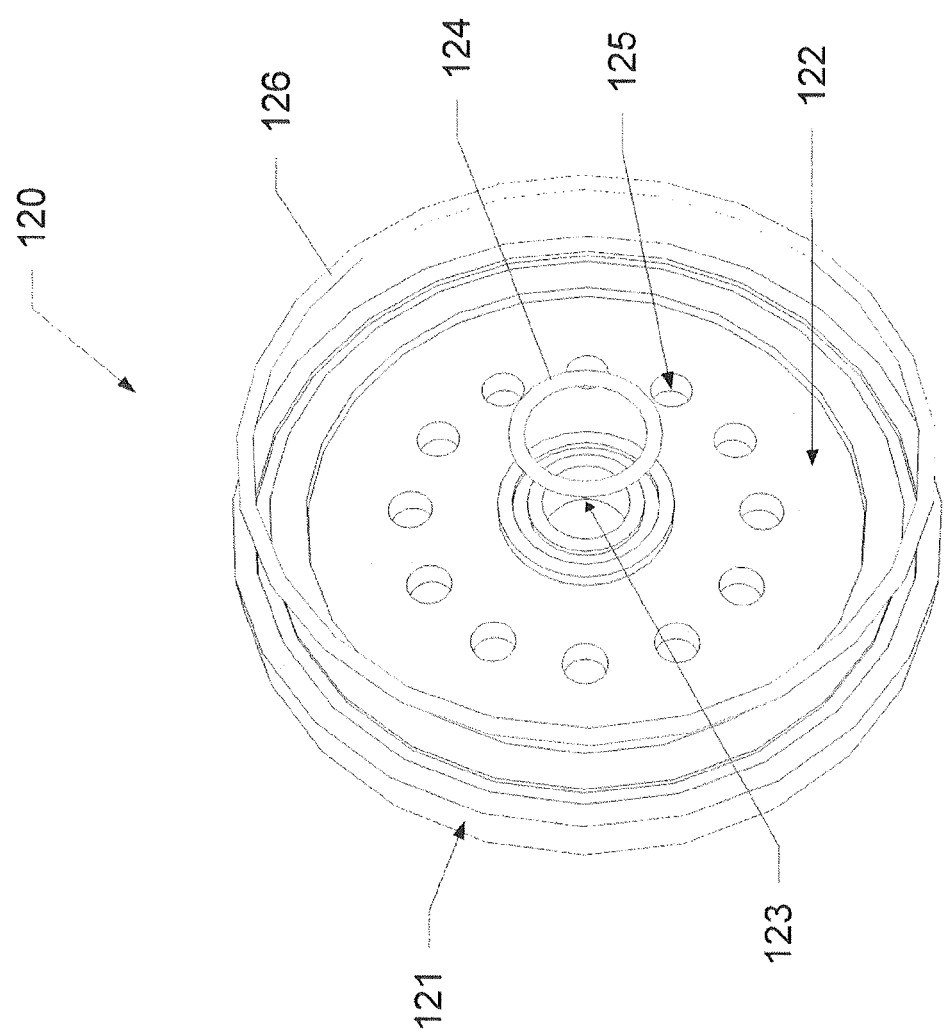
FIG. 7 shows a coupling for connecting two filter modules in a perspective exploded illustration.

FIG. 7 finally shows, in a perspective exploded illustration, a coupling 120 which is suitable for use in the filtration system 100 illustrated in FIG. 5a and which comprises a coupling body at 121 with ducts (123, 125) for untreated and permeate fluid, and one or two seals 124 and one or two seals 126.

The invention claimed is:

1. A filter module comprising one or more flat filter elements wound spirally about an axis, a first end wall and a second end wall, wherein
    each flat filter element comprises two filter membranes and a drainage layer arranged between the filter membranes;
    each flat filter element has first and second edge regions which run substantially in the direction of the axis and are sealed in a fluid-tight manner over their entire length;
    each flat filter element has a third edge region which is connected to the first end wall;
    the third edge region is open at an outer side of the first end wall;
    the third edge region is sealed in a fluid-tight manner in relation to an inner side of the first end wall; and
    each flat filter element has a fourth edge region which is connected to the second end wall and sealed in a fluid-tight manner in relation to an inner side of the second end wall,
    the filter module comprises filter elements that are fluid-tight sealed relative to an optional distributor pipe,
and the two filter membranes each comprise a woven or nonwoven support fabric and a porous membrane layer made from polymer.

2. The filter module as claimed in claim 1, wherein the fourth edge region is enclosed in a fluid-tight manner by the second end wall or is open on an outer side of the second end wall.

3. A filter module for liquids comprising one or more flat filter elements wound spirally about an axis,
    a first end wall and a second end wall, wherein
    each flat filter element comprises two filter membranes and a drainage layer arranged between the filter membranes;
    each flat filter element has first and second edge regions which run substantially in the direction of the axis and are sealed in a fluid-tight manner over their entire length;
    each flat filter element has a third edge region which is connected to the first end wall;
    the third edge region is open at an outer side of the first end wall;
    the third edge region is sealed in a fluid-tight manner in relation to an inner side of the first end wall; and
    each flat filter element has a fourth edge region which is connected to the second end wall and sealed in a fluid-tight manner in relation to an inner side of the second end wall, and
    each of the filter membranes is area bonded to the drainage layer via a continuous adhesive net of thermoplastic polymer.

4. The filter module as claimed in claim 1, wherein the flat filter elements withstand a trans-membrane differential pressure between the outer side of the filter membranes and the drainage layer of greater than 2 bar without mechanical damage or leaks forming.

5. The filter module as claimed in claim 1, wherein spacer elements which are of sheet-like design through which, the flow can pass are arranged between the outer side of the spirally wound flat, filter elements and the inner side of the same or further flat filter elements, said inner side being adjacent to said outer side.

6. The filter module as claimed in claim 1, where said filter module has a filtration surface of greater than 50 m$^2$.

7. The filter module as claimed in claim 1 wherein the flat filter elements have a length of 0.1 to 6.0 m in the direction of the axis.

8. The filter module as claimed in claim 1, wherein the flat filter elements are spirally wound and have a radial dimension of 0.05 to 1.5 m with respect to the axis.

9. The filter module as claimed in claim 1, wherein the flat filter elements are spirally wound and an outer side of a spirally wound flat filter element and an inner side of an adjacent spirally wound flat filter element are separated by a radial distance of 0.1 to 20 mm.

10. The filter module as claimed in claim 1, wherein the first end wall and/or the second end wall have/has centrally arranged ducts.

11. The filter module as claimed in claim 3, wherein said filter module comprises a distributor pipe, the distributor pipe being connected to a centrally arranged duct and/or having one or more openings in its walls.

12. The filter module as claimed in claim 1, wherein said filter module comprises a housing, and the housing is connected in a fluid-tight manner to the first and the second end wall.

13. The filter module as claimed in claim 10, wherein said filter module withstands an internal pressure of greater than 2 bar without mechanical damage or leaks forming.

14. The filter module as claimed in claim 12, wherein the housing is of tubular configuration.

15. A filtration system for filtering a permeate fluid out of an untreated fluid, comprising
    filter modules as claimed in claim 1;
    couplings for connecting the end walls of filter modules; and
    lines for untreated fluid and permeate fluid.

16. The filtration system as claimed in claim 15, wherein each coupling comprises a coupling body with ducts for permeate fluid and seals, the seals enclosing the ducts for permeate fluid in a fluid-tight manner.

17. The filtration system as claimed in claim 16, wherein each coupling has a duct which is arranged centrally in the coupling body for untreated fluid, and seals, the seals enclosing the duct for untreated fluid in a fluid-tight manner and sealing said duct in a fluid-tight manner in relation to the ducts for permeate fluid.

18. The filtration system as claimed in claim 16, wherein each coupling has ducts which are arranged peripherally in the coupling body for untreated fluid, and seals, the seals enclosing the ducts in a fluid-tight manner.

19. The filter module as claimed in claim 4, wherein the flat filter elements withstand a transmembrane differential pressure between the outer side of the filter membranes and the drainage layer of greater than 10 bar without mechanical damage or leaks forming.

20. The filter module as claimed in claim 4, wherein the flat filter elements withstand a trans-membrane differential pressure between the outer side of the filter membranes and the drainage layer of greater than 20 bar without mechanical damage or leaks forming.

21. The filter module as claimed in claim 6, wherein said filter module has a filtration surface of greater than 250 m$^2$.

22. The filter module as claimed in claim 6, wherein said filter module has a filtration surface of greater than 1000 m$^2$.

23. The filter module as claimed in claim 7, where the flat filter elements have a length of 0.4 to 4.0 m in the direction of the axis.

24. The filter module as claimed in claim 7, wherein the flat filter elements have a length of 0.6 to 2.5 m in the direction of the axis.

25. The filter module as claimed in claim 8, wherein the spirally wound flat filter elements have a radial dimension of 0.1 to 1.25 m with respect to the axis.

26. The filter module as claimed in claim 8, wherein the spirally wound flat filter elements have a radial dimension of 0.2 to 0.8 m with respect to the axis.

27. The filter module as claimed in claim 9, wherein the radial distance is 0.3 to 8 mm.

28. The filter module as claimed in claim 9, wherein the radial distance is 0.5 to 3 mm.

29. The filter module as claimed in claim 13, wherein said filter module withstands an internal pressure of greater than 10 bar without mechanical damage or leaks forming.

30. The filter module as claimed in claim 13, wherein said filter module withstands an internal pressure of greater than 20 bar without mechanical damage or leaks forming.

31. The filter module as claimed in claim 1, wherein the first end wall is a single piece comprised ox epoxy that forms a flange.

32. The filter module as claimed in claim 1, wherein said-filter module comprises a distributor pipe.

33. The filter module as claimed in claim 3, wherein said drainage layer comprises first and second sheets having a loop structure and a system of pile threads disposed between said first and second sheets, said pile threads passing alternatingly through loops of the first and second loop structures, thereby forming a sawtooth or spiral course.

* * * * *